United States Patent Office 3,491,060
Patented Jan. 20, 1970

3,491,060
POLYIMIDOCARBONIC ESTERS AND THEIR
PREPARATION
Hans-Dieter Schminke, Cologne-Mulheim, Wilhelm
Gobel, Cologne-Flittard, Ernst Grigat, Cologne-
Stammheim, and Rolf Putter, Dusseldorf, Germany, assignors to Farbenfabriken Bayer Aktiengesellschaft, Leverkusen, Germany, a corporation of Germany
No Drawing. Continuation-in-part of application Ser. No. 459,105, May 26, 1965. This application July 11, 1967, Ser. No. 652,415
Int. Cl. C08g 33/00
U.S. Cl. 260—47                          6 Claims

ABSTRACT OF THE DISCLOSURE

Novel polyimidocarbonic esters are prepared by reacting polyvalent organic cyanic acid esters with polyvalent hydroxyl compounds.

---

This invention is a continuation-in-part application to copending parent application Ser. No. 459,105 filed May 26, 1965 and now abandoned. The invention relates to organic chemical compositions and more particularly to synthetic polymeric materials.

This invention has as an object the preparation of new polymeric materials. A further object is the preparation of linear or crosslinked polymeric resins. Another object is the preparation of polymers which can be utilized in the manufacture of films and plastics. Still another object is the improvement of synthetic resins. Other objects will appear hereinafter.

These objects are accomplished by reacting polyvalent organic cyanic acid esters with polyvalent hydroxyl compounds. The products are polymers. When the reactants are bifunctional, i.e., when one reactant contains two cyanic acid ester groups and the other reactant contains two hydroxyl groups, the products are linear. When the reactants are of higher functionality, cross-linked polymers are obtained. When one of the reactants is already polymerized, the product is a modified polymer of higher molecular weight.

As is known the cyanic acid exists in several tautomeric forms such as HOCN, HNCO, HCNO, HONC. The salts and esters thereof are more clearly defined and identified, but of course are still isomeric forms. The esters of the cyanic acid have the structural formula A—O—C≡N wherein A is an organic radical.

Polyvalent organic cyanic acid esters, therefore, which are useful as starting material in the manufacture of the new resins include compounds of the formula R(OCN)$_x$, in which R is any aromatic, araliphatic or heterocyclic radical, $x$ is an integer of at least two and preferably between 2 and 6.

It is preferred to employ compounds which have their OCN-groups attached to an aromatic ring system. The polyvalent cyanic ester, therefore, in its simplest form can be derived from benzene, napthalene, anthracene or the like. It can be e.g., the compound

or

It is of course possible that in the previous type the ring system carries substituents, e.g.

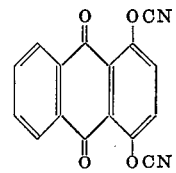

R may carry further substituents in addition to the OCN groups, e.g. the following groups, which may be further substituted: Alkyl-, cycloalkyl, aralkyl- or aryl-dialkylamino-, acylamino-, halogen-, nitro-, sulphonic acid-, sulphonic acid ester-, sulphonic acid amide-, carboxylic acid-, carboxylic acid ester-, carboxylic acid amide-, alkoxy-, aroxy-, acyloxy-, acyl-, aldehyde-, sulphonic-, thiocyanogen-, isothiocyanogen-, alkylmercapto-, arylmercapto-, acylmercapto- and cyanic acid groups.

Another type contemplated in the present invention as starting material comprises cyanic esters in which several aromatic nuclei are connected together like in the diphenyl series, e.g.

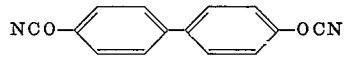

or

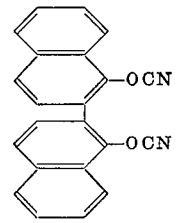

Further useful compounds include aromatic materials in which the aromatic nuclei are bridged through alkylene residues or hetero atoms such as —O—, —S—, —SO$_2$—, —CO—, —C(CH$_3$)$_2$—, —CH(CH$_3$)—,

—CH(CH$_3$)—CH$_2$—C(CH$_3$)$_2$—

—CH$_2$—O—CH$_2$—.

Another class of aromatic cyanic acid esters comprises compounds with repeated bridges of the before-mentioned type, for example,

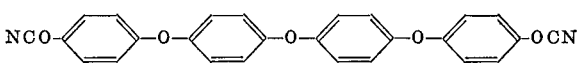

or

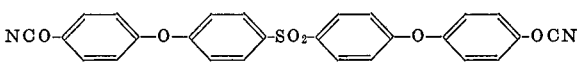

The invention further contemplates the use of starting cyanic acid ester compounds of the general formula

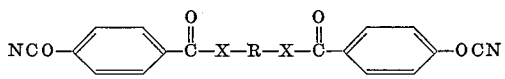

with X=O or NH or NR', R' being a lower alkyl radical, R is the residue of e.g. a hydrocarbon including polymeric ones, such as polyolefines, and oligoglycol or polyglycol including, for instance, polyalkylene glycol ether, a polyester, polyurea, polyamine, polyurethane or polyamide.

Another group of cyanic esters includes compounds like

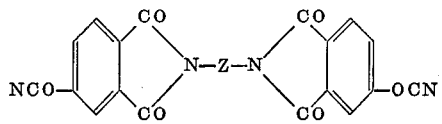

wherein Z represents aliphatic or aromatic hydrocarbon radicals which may also contain hetero atoms, such as

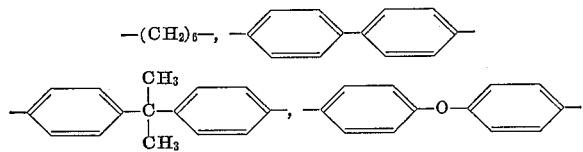

Still further starting materials comprise compounds of the following type

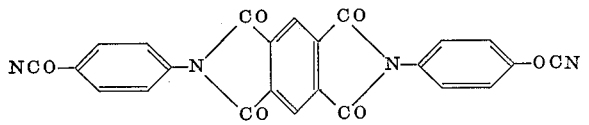

or

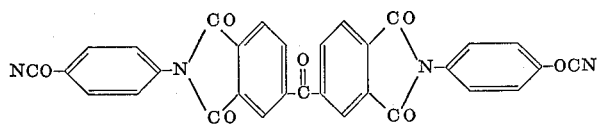

For sake of convenience several classes of aromatic cyanic esters, which are preferred, have been discussed with the cyanic groups in para-position. It is understood that OCN-groups in meta- or other positions are useful as well. It is further understood that the aromatic nuclei can have substituents as outlined above. Preferred substituents are the halogens, especially fluorine and chlorine, the lower alkyls. It is also understood that the above-mentioned types given as examples can have more than two cyanic groups. It is, however, preferred to employ bivalent cyanic acid esters.

The following are examples of suitable polyvalent cyanic acid esters: Unsubstituted and substituted bis- and polycyanato aromatic compounds such as 1:3- or 1:4-dicyanato benzene; 1:3- or 1:4- or 1:5- or 1:6- or 1:7- or 1:8- or 2:6- or 2:7-dicyanato naphthalene; 1:4- or 1:5-dicyanato anthraquinone; 1:3:5-tricyanatobenzene; 1:3:5- or 1:3:6-or 1:3:7-tricyanatonaphthalene; 2:2'- or 3:3'-or 4:4'-dicyanatodiphenyl, 2:2'- or 4:4'-dicyanatodinaphthyl(1:1', 1-methyl-3:5-dicyanatobenzene; 1-methyl-2:5 - dicyanatobenzene; 2 - (o-chlorophenyl)-1:4-dicyanatobenzene; 4 - chloro - 1:3-dicyanatobenzene; 2-chloro-1:4-dicyanatobenzene; 2-bromo-1:4-dicyanatobenzene; 3:5:3':5'-tetrachloro-2:2''-dicyanatodiphenyl; 2-nitro-1:3-dicyanatobenzene; 4-acetyl-1:3-dicyanatobenzene; 2:4-, 3:5-dicyanatobenzoic acid esters, 1:4-dicyanatobenzene-2:5-dicarboxylic acid ester, 4:6-dicyanatobenzene dicarboxylic acid ester-1:3; 4:4'-dicyanato-diphenyl-carboxylic acid(2) - ester; 2:3-dicyano-1:4 - dicyanatobenzene; and further, unsubstituted and substituted polycyanato compounds in which the radicals which carry the cyanato group are connected by bridge members, such as 4:4'-dicyanato-diphenylmethane; 4:4' - dicyanatodiphenyl-methyl-methane; 4:4' - dicyanato-diphenyl-dimethylmethane; 1:1-bis-(4-cyanatophenyl)-cyclohexane; 4:4-bis-(4'-cyanatophenyl)-valeric acid ester; 5:5'-methylene-bis-(2-cyanatobenzoic acid ester); 5:5'-methylene-bis-(2-cyanato-3-methyl-benzoic acid ester); 2:2$^1$ - dicyanatodinaphthyl (1:1$^1$ - methane; 4:4'-dicyanato-diphenylethane; 4:4'-dicyanato-stilbene; 4:4' - dicyanato - diphenylether; 4:4'-dicyanato-benzophenone; and 4:4''-dicyanatodiphenylsulphone.

Further starting materials are derived from condensation products of phenols and aldehydes, such as novolaks, or from phenol modified xylene formaldehyde resins, which are reacted with halogen cyanide to give polycyanic esters in accordance with French Patent 1,481,425.

Mixtures of polyvalent cyanates can, of course, be used.

Polyvalent organic cyanic acid esters can easily be prepared in accordnace with the detailed description of French Patent 1,389,079 from polyvalent phenols and cyanogen halides, e.g. chlorocyanide at temperatures up to 65° C. in the presence of an organic or inorganic basically reacting compound.

The hydroxyl compounds useful in the present invention can be of primary, secondary or tertiary nature, they can be saturated or unsaturated. Besides this, the hydroxyl compound which must have at least two hydroxyl groups can be of aliphatic, araliphatic, aromatic, heterocyclic or cyclic nature with any substituents.

The following polyvalent hydroxyl compounds may be mentioned as examples; they can be substituted or unsubstituted like the cyanic acid esters: 1,2-dihydroxyethane, 1,2- or 1,3-dihydroxy-propane, 1,2- or 1,3- or 1,4- or 2,3-dihydroxy-butane, 1,2- or 1,3- or 1,4- or 1,5- or 2,3- or 2,4-dihydroxy-pentane, the correspondent dihydroxy hexane, -heptane, -octane, -nonane, - decane, -undecane, -dodecane, -hexadecane, -octadecane, 1,4-dihydroxybutene, 1,4-dihydroxy-2-methyl butane, 1,5-dihydroxy-2,2-dimethyl pentane, 1,5-dihydroxy-2,2,4-trimethyl pentane, di-(β-hydroxy-ethyl).-thioether, di-(β-hydroxy-ethyl)-ether (= diglycol), triglycol, tetraglycol, trimethylol propane, 1,2- or 1,3- or 1,4-cyclohexane diol, 4,4'-dihydroxy-dicyclo-hexyl methane, 4,4'-dihydroxy-dicyclohexyl methyl methane, 4,4'-dihydroxy-dicyclohexyl-di-methyl-methane, 4-hydroxybenzyl alcohol, glycerine, 1,4-di-(β-hydroxyethoxy)-benzene, triethanol amine, 1,2- or 1,3- or 1,4-dihydroxy benzene, 1-methyl-2,4-(2,3- or 2,4- or 2,6- or 2,5- or 3,5- respectively)-dihydroxy-benzene, 1,3-dimethyl-2,4 (4,6- respectively) dihydroxy benzene 1,4-dimethyl-2,5-dihydroxy benzene, 1-ethyl-2,4-dihydroxy benzene 1-isopropyl-2,4-dihydroxy benzene, 1-chloro-2,4-dihydroxy benzene, 1 - nitro-2,4-dihydroxy benzene, 1,3-dichloro-2,4-(4,6- respectively) dihydroxy benzene, 1,4-dichloro-2,5-dihydroxy benzene 1-methoxy-2,4 (2,5- respectively) -dihydroxy benzene, 4,4'-dihydroxy-azobenzene, 2,4- or 4,4'-dihydroxydiphenyl ether, 2,2'-dihydroxy-ethylene glycol-di-phenylether, 1,3- or 1,4- or 1,5- or 1,6- or 1,7- or 1,8- or 2,6- or 2,7-dihydroxy-naphtaline, 4,4'-dihydroxy-diphenyl amine, 2,4'- or 4,4'-dihydroxy diphenyl, 2,4,4'-trihydroxy diphenyl, 4,4'-dihydroxy diphenyl methane, 4,4'-dihydroxy-di-phenyl-methyl methane, 4,4'-dihydroxy diphenyl dimethyl methane, 1,1-di-(4'-hydroxyphenyl)-cyclohexane, 3,3'-dihydroxybenzophenone, 1,3,5-trihydroxy benzene.

In the production of the polyurethane foams, in addition to the organic polyisocyanate and the active hydrogen containing compound and the blowing agent, it is often advantageous to include other components which aid in making a product having the best physical properties. It is particularly desirable to use a catalyst and a stabilizer. Any suitable catalyst may be used, but as has been proposed heretofore, it is often desirable to have a mixture of a tin compound and a tertiary amine catalyst present. Any suitable tin compound may be used including, for example, stannous chloride or an organic tin compound. It is preferred to use the organic tin compounds such as the stannous salts of carboxylic acids including stannous oleate, stannous octoate, stannous stearate and the like. But one may also use tetravalent tin compounds including for example dibutyl tin dilaurate, dibutyl tin di-2-ethyl hexoate and the like.

It is often advantageous in the production of cellular polyurethane plastics to include other additives in the reaction mixture such as, for example, emulsifiers, foam stabilizers, coloring agents, fillers and the like. It is particularly advantageous to employ an emulsifier such as, for example, sulphonated castor oil and/or a foam stabilizer such as a silicone oil such as, for example 4,4', 4''-trihydroxy-triphenyl methane, 4,4'-dihydroxydiphenyl-(di)-sulfide, 4,4-dihydroxy-diphenyl sulfone, 1,3,7-trihydroxy-naphthalene, cyanuric acid.

Polyethers having hydroxyl groups can be used as well as polyesters, polyester amides or polyamides having these end groups. Also to be mentioned are reaction products of polyisocyanates with an excess of polyhydroxyl compounds, that is polyurethanes with terminal hydroxyl groups.

Furthermore, it is possible to use as hydroxyl compounds those listed above on the cyanato side of reaction partners with hydroxyl groups instead of the OCN groups. In other words, the invention contemplates, inter alia, all hydroxyl compounds of the structure disclosed above for the cyanic acid esters having the cyanic groups replaced by hydroxyl groups.

Also for the hydroxyl partner, bivalent compounds are preferred. Otherwise, there is no restriction on the type of hydroxyl compounds. Mixtures of polyvalent hydroxyl compounds can, of course, be used.

In carrying out the invention the polyvalent cyanic acid esters and the polyvalent hydroxyl compounds are simply brought together. They react with each other without addition of any other substance, but it is preferred to add catalysts or to heat the reaction mixture. Suitable catalysts are bases like alkali metals, e.g. sodium, potassium and the hydroxides, carbonates, hydrides, phenolates and alcoholates of alkalis like sodium, potassium or lithium as well as the corresponding alkaline earth compounds e.g. calcium, strontium and barium and tertiary amines.

Any suitable tertiary amine catalyst may be used and a particularly strong tertiary amine catalyst is triethylene diamine. If weaker catalysts are desired, one may use, for example, N-methyl morpholine, N-ethyl morpholine, N-coco morpholine, 1-methyl-4-dimethylamino ethyl piperazine, 3-methoxy-N-dimethyl propyl amine, N-dimethyl-N'-methyl isopropyl propylene diamine, N,N-diethyl-3-diethyl amino propyl amine, dimethyl benzyl amine, permethylated diethylene triamine and the like.

The catalyst is employed in an amount of from 0.001–100 percent by weight, calculated on the reaction mixture. It is preferred to use 0.001–5 percent by weight. The amount, of course, depends to a large extent on the activity of the catalyst, the reactivity of the respective partners and the equivalent functionality of the reaction system.

The reaction proceeds with sufficient speed at room temperature. Gentle heating is sometimes preferable. Depending on the nature of the specific starting materials it might be advantageous to complete the reaction by raising the temperature or to proceed at all at elevated temperature. In general temperatures up to 200° C. are believed to be sufficient. The reaction need not, but is preferred to take place in a solvent. The concentration of the reactants is not critical. It is of course desirable to have for economic reasons a solution as concentrated as possible. Suitable solvents are, for example, aliphatic and aromatic hydrocarbons which may, if desired, be halogenated or nitrated, e.g. benzene, toluene, chlorobenzene, nitrobenzene, ligroin, chloroform, carbon tetrachloride and nitromethane; equally suitable are esters and amides such as ethyl acetate and dimethylformamide; ketones such as acetone, methyl ethyl ketone, ethers such as diethyl ether, dioxane and diethylene glycol-mono (or -di)-ethyl ether; alcohols such as methanol, ethanol and isopropanol; nitriles such as acetonitrile or dimethylsulphoxide.

In general, the components are reacted together in equivalent quantities although the cyanate component can be used in excess if it is desired to obtain a reaction product having free cyanate groups, and the hydroxyl component can be used in excess if it is desired to have free hydroxyl groups in reaction product.

Using bifunctional starting materials, linear products are obtained. If one or both of the starting components of higher functionally, crosslinked products are obtained. The reaction products are of higher molecular weight and contain a plurality of polymidio carbonic ester groupings:

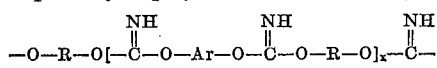

In the case of linear products derived from bifunctional starting components R is any bivalent organic residue. If one employs e.g. trivalent alcohols, then the above R has a side branch terminating in —O— which has attached thereto another group.

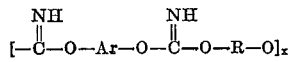

Such compounds are hitherto known only to the extent R is an arylene radical. These known compounds, however, are prepared by quite a different process, i.e., by reacting polyhydroxyl compounds with cyano halogens. The present procedure allows the manufacture of polymido carbonic esters by any variation of hydroxyl components and cyanic acid components. Furthermore R is no longer restricted to arylene radicals and is no longer necessarily identical with the specific Ar in such individual case. Finally it is not necessary to remove alkali halogenides from the polymerisate which is formed. In other words, compounds containing the above recurring grouping with R being anything else but identical with the Ar in each specific case are novel. According to the old process it is at most possible to arrive at molecular weights up to about 5000. The present procedure, however, allows the manufacture of polymers with molecular weights up to about 60,000. In other words, even when R and Ar in the recurring units of the above formula are identical in one individual case the polymers with a molecular weight of more than 5,000 are novel polymers.

If the product precipitates, it may be isolated by vacuum filtration. In other cases the recation product may be isolated by pouring the reaction solution into a solvent in which the reaction product is insoluble and hence precipitates and can be removed by vacuum filtration. Examples of suitable solvents for this purpose are water, methanol and ethanol. Alternatively, the solvent can be removed by evaporation. If the product contains sulphonic acid groups, then it may be obtained by salting out after pouring the reaction solution into water.

The synthetic resins obtained by the process of the invention can be worked up by known methods of working up commonly employed in the field of synthetic resins to produce a large variety of different articles with valuable physical and chemical properties.

They can, for example, be kneaded, rollered, pressure-moulded or injection-moulded at elevated temperatures and pressures to produce a variety of shaped articles. It is also possible to work them up from solutions, especially to form lacquer coatings, films and foils. These substances can be worked up without or with additives such as plasticisers, fillers, pigments, antistatic agents, flame-protective agents. The products of the present invention can be processed together with other polymers. Such blends allow for modifications of the mechanical properties of the foil, film and mouldings.

Suitable substances for use as plasticisers are the usual esters of aromatic or aliphatic mono-, di- or poly-carboxylic acids, e.g., acetates, adipates, sebacates, azelainates, benzoates, phthalates, isopthalates, terephthalates, trimellithates or pyromellithates. Polymer plasticers based on polyesters, phosphoric acid esters, alkylsulphonic acid esters, phenols extended with polyether groups, alcohols, glycols or thiodigycols, which compounds may also be substituted, are also used as plasticisers. In addition, multinuclear aromatic compounds such as diphenyl, terphenyls or their chlorinated, nitrated or sulphonated derivatives are to be mentioned. Fillers which are often used such as chalks and silicates may be blended with the new polymers but other salts and, if desired, strongly oxidising substances such as nitrates, chlorates and perchlorates can also be used. In addition, the reaction products can be worked up with sawdust, natural and synthetic fibres and fabrics and with carbon blacks including conductive carbon blacks.

To reduce the inflammability, non-inflammable compounds of phosphorus or of antimony or halogen compound can be worked into the new polymers or applied to their surface. Compounds which reduce the surface resistance, hydrophilic substances such as polyglycols or quaternary ammonium compounds can also be incorporated. Also, they may be blended with numerous known polymers such as polyvinyl chloride and its copolymers, polyvinylidene chloride, polystyrene, styrene-acrylonitrile copolymers and ABS copolmers, natural and synethic rubber, chlorine rubber, butadiene-acrylonitrile copolymers and ethylene-vinyl acetate copolymers as well as vinyl chloride-ethylene vinyl acetate coploymers. Further, they can be combined with cellulose esters and the precondensation products of phenol-formaldehyde resins.

Working up with mono- and polyisocyanates as well as with polyurethanes is also possible.

When the new polymers have been hardened, if necessary with the use of pressure at elevated temperature, the synthetic resins produced according to the invention give rise to highly cross-linked, glass-clear synthetic resins with a very hard surface. They have very good adhesion to metal, wood, glass and synthetic resins and a very good resistance to chemicals.

The more detailed practice of the invention is illustrated by the following examples. There are of course many forms of the invention other than these specific embodiments.

EXAMPLE 1

8 g. of 1,3-dicyanatobenzene and 5.5 g. of resorcinol are dissolved in 100 ml. of acetone. 5 drops of 10 N aqueous sodium hydroxide solution are added. After some hours the colorless precipitate is removed by vacuum filtration, washed with acetone and dried.

Yield _____ g__ 12.5
Melting point _____ °C__ 1.34
N-content _____ percent__ 9.90

The IR spectrum shows the characteristic bands for an imino ether group between 5.9 and 6.0µ.

EXAMPLE 2

8 g. of 1,4-dicyanatobenzene and 5.5 g. of hydroquinone are dissolved in 100 ml. of acetone. 10 drops of triethyl amine are added to the solution. After some hours a solid precipitate which is removed by vacuum filtration and washed with acetone is obtained.

Yield _____ g__ 11.6
Melting point _____ °C__ 132

EXAMPLE 3

3 drops of 10 N aqueous sodium hydroxide solution are added to a solution of 14 g. of 4,4'-dicyanato diphenyl methyl methane and 11.4 g. of 4,4'-dihydroxy diphenyl dimethyl methane in 100 ml. of dimethyl formamide. The temperature rises within 10 minutes from 23° to 35° with an increase of viscosity. After 30 minutes stirring the reaction mixture is poured into water. The solid mass precipitates and is removed by vacuum filtration.

Yield _____ g__ 23
Melting point _____ °C__ 155

The product is soluble inter alia in chloroform, methylene chloride, dioxane, dimethylene glycol monomethyl ether, dimethylsulfoxide, glacial acetic acid, benzonitrile, acetophenone.

EXAMPLE 4

9.9 g. of 1,4-di-(β-hydroxyethoxy)-benzene are dissolved in 50 ml. of dimethyl formamide. A small piece of metallic sodium is added. When the reaction is completed, a solution of 14 g. of 4,4'-dicyanatodiphenyl dimethyl methane in 50 ml. of dimethyl formamide is added and the reaction mixture is heated for one hour to 60°C. the reaction mixture is poured into water and the precipitate removed. 17.7 g. of a colorless product are obtained. Melting point, 117°C.

EXAMPLE 5

3 drops of 10 N aqueous sodium hydroxide solution are added to a solution of 11.8 g. of 1,6-hexane diol and 14 g. of 4,4'-dicyanato diphenyl dimethyl methane in 100 ml. of acetone. The mixture is heated for 90 minutes to 50°C. Pouring into water yields a greasy product which becomes solid when rubbed.

Yield _____ g__ 14.5
Melting point _____ °C__ 95

EXAMPLE 6

1000 g. of a linear polyester from adipic acid and ethylene glycol (OH number 50 to 60) are dehydrated in vacuo at 120°C. 160 g. of 1,4-dicyanato benzene are added. After addition of 2 g. of triethylene diamine the temperature rises to 160°C. The mixture becomes increasingly viscous. Finally a tough mass is obtained which solidifies, a product which is insoluble in solvents.

EXAMPLE 7

1000 g. of the polyester of example 6 are dehydrated in vacuo at 120°C. 2 g. of triethylene diamine are added. Then 310 g. of 4,4'-dicyanato diphenyl dimethyl methane are added portionwise. After 50 to 60 minutes the highly viscous reaction product is poured onto plates and heated at 140°C., until the reaction is completed. A solid elastic polyimino carbonic ester is obtained.

EXAMPLE 8

1000 g. of the polyester of example 6 together with 2 g. of triethylene diamine and with a mixture of 140 g. of 4,4'-dicyanato diphenyl dimethyl methane and 80 g. of 1,4-dicyanato benzene are reacted as in Example 7. On plates a solid elastic polymer is obtained which is practically resistant against solvents.

EXAMPLE 9

1000 g. of a linear polyether from propylene oxide and propylene glycol (molecular weight 2000; OH number 56) are dehydrated. 2 g. of triethylene diamine and 280 g. of 4,4'-dicyanato diphenyl dimethyl methane are added portionwise. When the exothermic reaction ceases, the mixture is heated for 30 minutes to 170 to 180° C. A plastic sticky polyimino carbonic acid ester is obtained which is swellable in tetrahydro furane.

EXAMPLE 10

The procedure is as in Example 9 with the only exception that a branched polyether prepared from propylene oxide and trimethylol propane (molecular weight 3000 ± 200; OH number 56) instead of a linear polyether. A tough, plastic polyimino carbonic acid ester is obtained which is insoluble in tetrahydro furan.

EXAMPLE 11

5 to 10 drops of 10 N aqueous potassium hydroxide solution are added to a solution of 57 g. of 2,2-bis-(4-hydroxyphenyl)-propane in 100 ml. of acetone. Within 45 minutes a solution of 70 g. of 4,4'-dicyanato-di-phenyl dimethyl methane in 180 ml. of acetone is dropped in. The temperature rises to 40° C. Before the addition is completed, the solution becomes turbid. A tough product precipitates.

A solution of the polymer in methylene chloride is poured as a thin film onto a glass plate. After evaporation of the solvent a glass-clear foil is obtained. By addition of plasticisers, for instance 10 or 20 percent of diphenyl cresyl phosphate, the flexibility of the foils is increased.

EXAMPLE 12

3 drops of 10 N aqueous potassium hydroxide solution are added to 4.6 g. of glycerine. Within 10 minutes a solution of 21 g. of 4,4'-dicyanato diphenyl dimethyl methane in 70 ml. of acetone is dropped in. The temperature rises from 20 to 32° C. After stirring for 30 minutes the mixture is poured into water. Yield: 24 g.; melting point: 124° C.

EXAMPLE 13

3 drops of 10 N aqueous potassium hydroxide solution are added to a solution of 16 g. of 1,5-dihydroxy naphthalene in 200 ml. of dimethyl formamide. At 60° C. a solution of 28 g. of 4,4'-dicyanato diphenyl dimethyl methane in 70 ml. of dimethyl formamide is dropped in. After stirring for 60 minutes the mixture is poured into 800 ml. of water.

Yield: 42 g.; melting point 149° C.

EXAMPLE 14

Analogous to Example 13 23 g. of a product with a melting point at 170° C. are obtained from 6.4 g. of phloro glucine and 21 g. of 4,4'-dicyanato diphenyl dimethyl methane.

EXAMPLE 15

A solution of 21 g. of 4,4'-dicyanato diphenyl dimethyl methane is added dropwise to a mixture of 7.6 g. of triethanol amine and 10 ml. of dimethyl formamide within five minutes. The temperature thereby rises to 45° C. After stirring for 30 minutes the mixture is poured into water.

If reaction is carried out at 0° C., 25.5 g. of a product with a melting point at 170 to 180° C. are obtained.

EXAMPLE 16

Analogous to Example 15 14.3 g. of a product with a melting point at 125° C. are obtained from 5.95 g. of N-methyl diethanol amine and 14 g. of 4,4'-dicyanato diphenyl dimethyl methane.

EXAMPLE 17

A solution of 28 g. of 4,4'-dicyanato diphenyl dimethyl methane in 100 ml. of dimethyl formamide is added to a solution of 25 g. of 4,4'-dihydroxy diphenyl sulfone in 120 ml. of dimethyl formamide. As catalyst 3 drops of 10 N aqueous potassium hydroxide solution are used. After stirring for one hour the mixture is poured into water. The first greasy product solidifies.

Yield: 44 g.; melting point 124 to 125° C.

EXAMPLE 18

A solution of 10.1 g. of 2,2'-dicyanato-3,3',5,5'-tetramethyl dibenzyl ether in 100 ml. of dimethyl formamide is added to a solution of 6.8 g. of 4,4'-dihydroxy diphenyl dimethyl methane in 30 ml. of dimethyl formamide. Then 3 drops of 10 N aqueous sodium hydroxide solution are added. After stirring for one hour the mixture is poured into water.

Yield: 14 g.; melting point 100° C.

EXAMPLE 19

Analogous to Example 18 18.5 g. of a product with a melting point at 97 to 98° C. are obtained from 11.4 g. of 4,4'-dihydroxy diphenyl dimethyl methane and 10.1 g. of 2,4-dicyanato aceto phenone.

EXAMPLE 20

15 g. of 4,4'-dicyanato diphenyl sulfone are dissolved in 255 ml. of acetone and 11.4 g. of 4,4'-dihydroxy diphenyl dimethyl methane are dissolved in 35 ml. of acetone. Then 3 drops of 10 N aqueous sodium hydroxide solution are added. After stirring for one hour the mixture is poured into water.

Yield: 23.9 g.; melting point: 124° C.

What is claimed is:

1. A process for producing polyimidocarbonic esters which comprises contacting at a temperature of up to 200° C. a polyhydroxy compound with a compound of the formula $R(OCN)_x$ wherein R is an aromatic, araliphatic or heterocyclic radical and $x$ is at least 2.

2. The process of claim 1 wherein the compound of said formula and said polyhydroxy compound are contacted in an organic solvent solution.

3. The process of claim 1 wherein said polyhydroxy compound is a polyhydroxy polyester or polyether and wherein R of said compound of said formula is an aromatic radical.

4. The process of claim 1 wherein $x$ of said compound of said formula is 2.

5. The process of claim 1 wherein said polyhydroxy compound is a dihydroxy compound.

6. The process of claim 1 wherein said polyhydroxy compound and said compound of said formula are contacted in the presence of a tertiary amine, an alkali metal or an alkaline earth metal catalyst.

References Cited

UNITED STATES PATENTS

| | | | |
|---|---|---|---|
| 3,040,003 | 6/1962 | Beaman | 260—77.5 |
| 2,595,400 | 5/1952 | Maynard | 260—77.5 |

OTHER REFERENCES

Hedayatullah et al., C.R. hebd. Seances Acad. Sci., vol 256, pp. 4029—4032.

DONALD E. CZAJA, Primary Examiner

M. J. WELSH, Assistant Examiner

U.S. Cl. X.R.

161—190; 260—2.5, 13, 30.6, 30.8, 31.2, 31.8, 33.4, 33.6, 33.8, 37, 75, 77.5, 841, 857, 858, 859